United States Patent
Claycamp et al.

(10) Patent No.: US 6,541,047 B1
(45) Date of Patent: *Apr. 1, 2003

(54) MILK REPLACER AND DRY FEED COMPOSITIONS AND METHODS

(75) Inventors: Robert M. Claycamp, Seymour, IN (US); Robin L. Hayes, Rensselaer, IN (US)

(73) Assignee: Rose Acre Farms, Inc., Seymour, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/011,337

(22) Filed: Dec. 5, 2001

Related U.S. Application Data

(63) Continuation-in-part of application No. 09/342,935, filed on Jun. 29, 1999, now Pat. No. 6,348,223.

(51) Int. Cl.$^7$ .................................................. A23J 1/08
(52) U.S. Cl. .............................. 426/2; 426/47; 426/614; 426/630; 426/635; 426/648; 426/656; 426/658; 426/807
(58) Field of Search .............................. 426/2, 47, 614, 426/630, 635, 648, 656, 658, 807

(56) References Cited

U.S. PATENT DOCUMENTS

| | | | |
|---|---|---|---|
| 3,854,394 A | 12/1974 | Willsey | 99/495 |
| 4,001,449 A | 1/1977 | Reardanz et al. | 426/332 |
| 4,009,268 A | 2/1977 | Cardon et al. | 424/180 |
| 4,259,358 A | 3/1981 | Duthie | 426/46 |
| 5,085,874 A | 2/1992 | Jungvid | 426/41 |
| 5,503,868 A | 4/1996 | Fallin et al. | 426/656 |
| 5,643,622 A | 7/1997 | Sawhill | 426/41 |
| 5,656,309 A | 8/1997 | Sawhill | 426/41 |
| 5,785,990 A | 7/1998 | Langrehr | 424/442 |

FOREIGN PATENT DOCUMENTS

EP 426211 11/1993

OTHER PUBLICATIONS

Mississippi State University Extension Service; "Milk Replacers", Apr. 6, 1998; http://ext.msstate.edu/anr/livestock/dairy/dairypfaq7.html.
Published by Cooperative Extension, Institute of Agriculture and Natural Resources, University of Nebraska–Lincoln; "Calf Scours: Causes, Prevention and Treatment", Revised Nov. 1982; http://www.ianr.unl.edu/pubs/animaldisease/g269.htm.
Dupchak, K., Animal Nutritionist, Animal Industry Branch, Manitoba Agriculture; Feeding Tips from Manitoba Agriculture; Evaluating Milk Replacers For Claves, website dated Jan. 13, 1999; http://www.milk.mb.ca/Producer/replacer.htm.
Miksch, D., University of Maryland, "Diarrhea of Newborn Calves", Youngstock and Calves, 1980; http://www.inform.umd.edu/EdRes/Topic/AgrEnv/ndd/youngsto/DIARRHEA$_{13}$OF$_{13}$ NEWBORN$_{13}$ CALVES.html.
Sommerfeldt, J.L., University of Maryland, "Milk Replacers for Dairy Cattle", Youngstock and Calves, 1985; http://www.inform.umd.edu/EdRes/Topic/AgrEnv/ndd/youngsto/MILK$_{13}$ REPLACERS$_{13}$ FOR$_{13}$ DAIRY$_{13}$ CATTLE.html.
Jones et al., J. Food Techno., vol. 14(2), pp. 199–203; 1979.
Nielsen, Nordeuropaeisk Mejeri–Tidsskrift, vol. 47(2), pp. 45–50; 1981.

*Primary Examiner*—C Sayala
(74) *Attorney, Agent, or Firm*—Woodard, Emhardt, Naughton Moriarty & McNett LLP

(57) ABSTRACT

Improved milk replacer and dry feed compositions for young mammals are provided that employ a high quality inedible egg product to minimize or eliminate the need for milk source ingredients or plasma-enhanced food compositions. These improved compositions include one or more high quality inedible egg products in an amount from about 1% to 100% of the total weight of the composition. The balance of these improved compositions may consist of any ingredient(s) in any combination when such composition is capable of meeting or exceeding the nutritional requirements of the species to be fed.

23 Claims, 1 Drawing Sheet

Average Daily Gain (by group) vs. Amount of Egg per Day

MILK REPLACER AND DRY FEED COMPOSITIONS AND METHODS

CROSS-REFERENCE TO RELATED APPLICATION

This application is a continuation-in-part of U.S. patent application Ser. No. 09/342,935, filed on Jun. 29, 1999, now U.S. Pat No. 6,348,223 which is incorporated herein by reference in its entirety.

FIELD OF THE INVENTION

This invention relates generally to synthesized foodstuffs for young mammals and more particularly to milk replacer and dry feed compositions containing high quality inedible egg products as the main ingredient and to the method of producing such milk replacer and dry feed compositions.

BACKGROUND OF THE INVENTION

It is well known that in the early stages of life for a mammal, mother's milk is the ideal source of nutrition. Unfortunately for many young mammals, whether by tragedy or by economic necessity, as in the case of animals whose milk is commercially valuable, mother's milk is not always available. In these instances, the use of a milk replacing composition is required.

There exist many formulations for foodstuffs for neo-natal animals that incorporate dried milk products and vitamin and mineral supplements. The common feature of these prior art compositions is that they derive most of their protein content from a milk source ingredient such as skim milk, buttermilk, whole whey, delactosed whey, casein, milk albumin, and/or whey protein concentrate. Milk source ingredients are used extensively in traditional milk replacers because the existing health data relating to young mammals fed milk replacer diets based on non-milk source ingredients is poor. That is, animals fed with prior art milk replacers having protein sources other than milk proteins are known to suffer from protein deficiencies that can potentially result in debilitating illnesses. This data suggests that only milk-based milk replacers can be used to obtain a healthy young animal.

Conventional milk-based replacers suffer from a number of drawbacks, however. One such drawback relates to the high cost of milk source ingredients. This cost issue presents the conundrum that, while milk replacer compositions are designed to obviate the need for milk in those cases when the mother's milk is commercially important, the milk replacer composition still must use some amount of milk products in order to keep a young animal healthy.

Additionally, previous milk replacer composition formulas are not designed with the transition from milk to solid food in mind. This fact makes it difficult to wean animals fed with these prior art compositions from the liquid diet. If the young animal will not eat solid food right away, the costs of raising the animal increase significantly. This is because prior art milk replacers are more expensive than "adult" diets and must be hand fed. The most glaring drawback of prior art milk replacers, however, is that they are not nutritionally equivalent to, much less superior to, the mother's milk, so young animals fed these diets frequently fail to thrive and are left susceptible to disease.

In the case of piglets, economic factors encourage farmers to wean baby pigs from the sows as early after birth as possible, which in many cases means as early as ten days after birth. The physiological changes occurring in such young animals make it extremely important for the producer to control disease and provide correct nutrition to ensure a healthy piglet. The same economic factors driving early weaning drive the producer's need to put weight on the pigs as rapidly as possible without sacrificing the health of the animal. Piglets are highly sensitive to stress and shock, and many animals fed traditional diets fail to thrive when transferred from the farrowing house to the weaning and growing area.

This failure to thrive is an acute and persistent problem and manifests itself most frequently in the form of diarrhea and weight loss. Very young piglets are unable to maintain a low stomach pH, which fact hampers their ability to fully digest their feed and to kill undesirable bacteria that enter their intestines. The undigested food enters the large intestine, where the undesirable bacteria feed on it and cause diarrhea. The sick piglets have little desire to eat, and they can quickly decline to below their birth weight if they are not permitted access to antibody-containing mother's milk. The health and weight of the sow, however, can be threatened if she is made to suckle the piglets for too long.

In the case of dairy calves, the susceptibility to disease is an acute and persistent problem and manifests itself most frequently in the form of a disease known as "scours" or diarrhea. Calf scours causes more financial loss to herdsmen than any other disease-related problem they encounter. Because the problem of scours is so prevalent, many attempts have been made to formulate a feed supplement that minimizes the incidence of scours. These previous efforts include, among others, the addition of pregelatinized starch, optimizing the ratio of casein to whey proteins, forming soluble gels of dairy by-products, and using treated legumes to form protein and starch digestion products from which a feed may be manufactured.

These latter formulations provide some relief from the scours problem, but do not eliminate it, nor do they work particularly well to put weight on the young animal. As well, once a calf on a prior art diet gets scours, the farmer will have to administer expensive antibiotics and/or feed supplements that may or may not save the animal's life. This is because most, if not all, prior art milk replacer compositions cannot be fed to an animal with scours because they are so nutritionally deficient that they would only increase the animal's problem. These prior art compositions therefore leave significant room for improvement.

Some prior art milk replacer compositions have attempted to use eggs and/or modified egg products as the protein component. Because these prior art compositions employ a low quality and/or chemically modified egg fraction, however, these compositions are not able to equal or outperform milk protein-based compositions in terms of young animal weight gain and overall health of the young animal. Examples of these compositions can be found in U.S. Pat. No. 4,009,268 to Cardon et al., U.S. Pat. No. 5,085,874 to Jungvid, U.S. Pat. Nos. 5,643,622 and 5,656,309 to Sawhill, and European Patent No. 426,211 to Carrell et al.

This prior art leaves room for improvement in terms of composition, manufacturing method, and feeding method. The present invention is addressed to such improvement.

SUMMARY OF THE INVENTION

The present invention relates to food compositions for young mammals that consist essentially of a high quality inedible egg product or products in an amount from about 1% to 100% by weight and comprise at least one ingredient selected from the group consisting of milk products, cereal grain or cereal grain products, fruit pectin, other carbohydrates, fiber, fat, urea, electrolytes, vitamins, minerals, yeast, and other animal or vegetable protein sources as the balance of the composition. The food composition may be dry or liquid and may be pelletized or unpelletized. If the food composition is liquid, or if it is dry and made liquid by the addition of water or other ingredients, then it may be used as a milk replacer. If the food composition is not liquid or not made so by the addition of liquid ingredients, it may be used as a first solid food for a young mammal. One method of feeding the instant food compositions comprises feeding the milk replacer composition first, then transitioning the young mammal to the first solid food composition.

The provision of high quality inedible egg in the combinations of the present invention imparts desirable antimicrobial activity and a desirable amino acid profile to the foodstuffs. These food compositions allow a young mammal to enjoy levels of health and growth at least equivalent to those that it would enjoy if it were raised on its mother's milk. Also, by providing a first solid food composition that is similar in formulation to the milk replacer on which an animal is raised, animals may be weaned more quickly from the liquid diet and substantial labor savings in terms of food preparation and hand feeding may be enjoyed thereby. Further, the provision of high quality inedible egg in the combinations of the present invention provides a milk replacer with significant cost advantages over other milk replacer formulations.

These and other objects, advantages, and features are accomplished according to the compositions and methods of the following description of the preferred embodiments of the present invention.

DESCRIPTION OF THE PREFERRED EMBODIMENTS

Figure 1:
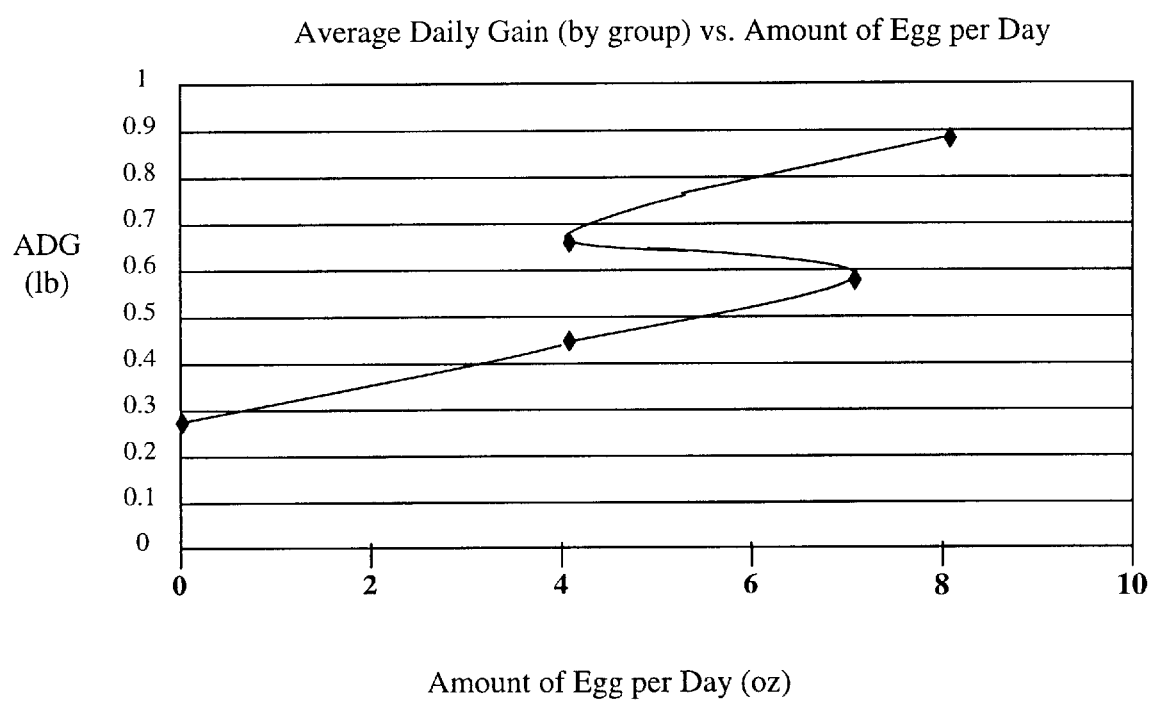
FIG. 1 is a graph of the average daily weight gain of calves fed the composition of the present invention.

For the purposes of promoting an understanding of the principles of the invention, reference will now be made to the preferred embodiments thereof, and specific language will be used to describe the same. It will nevertheless be understood that no limitation of the scope of the invention is thereby intended, such alterations, modifications, and further applications of the principles of the invention being contemplated as would normally occur to one skilled in the art to which the invention relates.

Before proceeding further, those of ordinary skill in the art will recognize that any young mammal that requires easily digested nutrients as a replacement for mother's milk and/or that would benefit from supplemental nutrition during the early stages of its life will benefit from being fed the diet program as hereinafter more fully described. It is therefore intended that the scope of the present invention include and comprise diet programs adapted to meet the nutritional requirements of any such young mammal. This is so regardless of the fact that the majority of the following description discusses the present invention in terms of particular formulations for and the benefits of feeding these formulations to young calves and young pigs.

The present invention concerns the use of a high quality inedible egg product as a primary source of protein, and in the most preferred embodiment as a primary source of nutrition, in a diet for young animals. Therefore, one aspect of the present invention concerns a method of manufacturing a high quality inedible egg product.

In one preferred embodiment of the present invention, the high quality inedible egg product is used in a liquid milk replacer. In another preferred embodiment of the present invention, the high quality inedible egg product is used in a dry feed for use as a first solid food for a young animal. According to another aspect of the present invention, there is provided a diet program for young animals comprising a milk replacer composition and a dry feed wherein the milk replacer composition is fed to the young animals first, then the dry feed is offered to the young animals during the weaning stage of development, and finally the dry feed becomes the young animals' first solid foodstuff.

The high quality inedible egg product that forms the basis of all the preferred diet compositions of the present invention begins with "inedible" eggs. Inedible eggs are defined to include those whole raw eggs, hard boiled eggs, egg yolks, egg albumen, and all other liquid or dry egg fractions that the United States Department of Agriculture ("USDA") has mandated cannot be used in human foods or for human consumption. Often the eggs that become inedible eggs are cracked, dirty, or misshapen. The term "inedible egg product" as used with this invention broadly encompasses any and all types of inedible eggs to which a dye has been added in conformance with USDA requirements.

The high quality of the inedible egg products contemplated for use with the present invention is obtained by employing the following method. Eggs destined to become inedible eggs are obtained, the shells broken, and a denaturant dye added to clearly show that the product is not for human consumption. Those of skill in the art will understand what classes of compounds may be used as the denaturant dye without affecting the nutritional analysis or makeup of the inedible egg. Next, the eggshells are removed by centrifuging the liquid egg through a filter, or by any other method known or contemplated for accomplishing the removal of shell debris from liquid egg.

The liquid egg obtained thereby is then held in refrigerated storage tanks at a temperature of about 45° F. or less until it can be delivered to the heat-pasteurizing unit, but preferably for not longer than about five days. Once the liquid egg is in the pasteurizer, it is heated to a temperature of at least 140° F. and held at that temperature for at least 4.5 minutes in order to kill all pathogenic and spoilage-inducing microorganisms. Again, those of skill in the art will recognize that the removal and/or growth inhibition of pathogenic and spoilage-inducing microorganisms may be accomplished by methods other than heat treatment, and such methods are intended and contemplated to come within the meaning of the term "heat pasteurizing" as it is used with the present invention.

At this point in the present manufacturing method, the manufacturer decides whether the inedible egg product will remain liquid or will be dried to produce a powder. If it is to remain liquid, the egg product is either packaged immediately or returned to a refrigerated storage tank until it can be packaged in an airtight and watertight container. If it is to become a dry inedible egg product, then the inedible egg product is either spray dried immediately or returned to a refrigerated storage tank until it can be spray dried.

The inedible egg product may then be spray dried without any additives according to those procedures known in the art of spray drying, or a free-flow or anti-caking agent may be added to the inedible egg product to prevent the formation of hard lumps in storage and then the egg product and free-flow agent spray dried. Most preferably, the moisture level of the resultant dry inedible egg product is between about 2 and about 5 percent.

Those of skill in the art will recognize that the use of a spray dryer is particularly desirable in that it minimizes damage to the proteins contained in the inedible egg product and therefore yields a very high quality inedible egg product. This dry inedible egg product may then be packaged in airtight and watertight containers for shipment and sale.

In the most preferred embodiments of this invention, whole inedible eggs are used to manufacture the high quality inedible egg product in order to obtain the full nutritional and flavor values possessed by whole eggs. The present high quality inedible egg product may be provided in a liquid or a dried form. The liquid form is preferably refrigerated during storage, although those of skill in the art will recognize that room temperature storage may be accomplished by methods known in the art such as chemical preservation and/or canning. Also, the liquid form may be blended with other preferred ingredients for convenience in storage, preparation, and feeding. The dried form does not require refrigeration during dry storage. The dried form may be reconstituted with water or other suitable liquid ingredients to form a liquid milk replacer according to the present invention, and it may also be dry blended with other preferred ingredients for convenience in storage, preparation, and feeding.

A preferred liquid milk replacer embodiment of the present invention comprises the high quality inedible egg product in an amount from about 1% to 100% by weight of the composition. The high quality inedible egg ingredient is typically present in the milk replacer in the range of about 25% to 100% by weight, and more preferably from 36% to 65% by weight.

A preferred dry feed embodiment of the present invention comprises the high quality inedible egg product in an amount from about 1% to 100% by weight of the composition. The high quality inedible egg ingredient is typically present in the feed in the range of about 25% to 100% by weight, and more preferably from 36% to 65% by weight.

The balance of the present inventive milk replacer and dry feed compositions, when those compositions comprise less than 100% high quality inedible egg product, may consist of any desired ingredients in any desired combination capable of supplying the nutritional requirements of a young mammal, including, but not limited to, milk products, cereal grain or cereal grain products, fruit pectin, other carbohydrates, fiber, fat, urea, electrolytes, vitamins, minerals, yeast, and other animal or vegetable protein sources.

As herein employed, the term "milk products" refers to and includes fluids secreted by the mammary glands of lactating female animals for the nourishment of their young and all fractions thereof and products derived therefrom. By way of example, and not of limitation, some milk products contemplated by and intended to come within the scope of the present invention include skim milk, buttermilk, whole whey, delactosed whey, casein, milk albumin, whey protein concentrate, whey permeates, whey sweet water, raw milk, powdered milk, and curd.

The term "cereal grain or cereal grain products" as used herein refers to the seeds or fruits of various food plants including the cereal grasses and other plants such as the soybean, and non-byproduct fractions and derivatives thereof. By way of example, and not of limitation, some cereal grains contemplated for use with the compositions of the present invention include oats, barley, wheat, corn, cottonseed, flax, hops, rice, rye, safflower seed, sunflower seed, almonds, walnuts, peanuts, buckwheat, and broomcorn.

"Other carbohydrates" as used in the present description describes a class of compounds formed of carbon, hydrogen, and oxygen that is capable of providing an easily digested ready source of energy to an animal. The present invention contemplates the use of any compound meeting the above description that is suitable for use in an animal feed, including complex sugars derived from various sources; simple sugars such as dextrose, fructose, galactose, and glucose; molasses; and starch. The foregoing list is provided for purposes of example only, and no limitation of the scope of the present invention is intended thereby.

The term "fiber" as used with the present invention refers to various food byproducts that provide an animal with roughage that is beneficial for the animal's digestive tract. Useful fibers can be brans, hulls, shells, or screenings of grains, seeds, or nuts. Screenings are obtained from cleaning grain and seeds, and include light and broken grains, agricultural seeds, weed seeds, hulls, chaff, straw, milldust, sand, and dirt. Some examples of other fiber sources include oat hulls, almond hulls, barley mill run, bean hulls, peanut skins, rice hulls, peanut hulls, nutshells, grape pomace, oat shorts, wheat shorts, wheat middlings, flax hulls, and soybean mill run. Again, these particular fiber sources are provided as examples only, and no limitation of the scope of the present invention is intended.

"Fat" refers to and describes any animal-edible compound capable of supplying the animal with a substantial amount of energy upon digestion of the compound. Some examples of useful fats include edible fats and oils from animal and vegetable sources such as mono-, di-, or tri-glycerides of various fatty acids such as stearic, palmitic, oleic, linoleic, lauric, and others. Animal-edible fats and oils can also include complex lipids such as phospholipids including fatty acid esters of glycerol phosphate or lecithin. Other fats that may be used include the oils, tailings or residues of soybean oil, corn oil, tallow, fish oil, coconut oil, palm oil, reclaimed restaurant fats and greases, acidulated soap stocks, and acidulated fats and oils. The foregoing list is provided for purposes of example only, and no limitation of the scope of the present invention is intended thereby.

The term "electrolytes" as used herein refers to a class of chemicals that will provide ionic conductivity when dissolved in water or when placed in contact with water. Suitable examples of this class of compounds include sodium chloride, sodium bicarbonate, and calcium carbonate. These particular electrolyte sources are provided as examples only, and no limitation of the scope of the present invention is intended.

The term "vitamin" as used herein refers to and includes all those organic compounds that are known to be essential to and/or used by animals to help regulate their metabolic processes but do not provide energy or serve as building units. As examples, the better known members of this class include vitamin A, vitamin B, vitamin B complex, vitamin C, vitamin D, vitamin E, vitamin K, and vitamin P. Many premixes of essential vitamins are available commercially for use in feeds for various animal species, including Microvit™ sold by Rhone-Poulenc Animal Nutrition and Custom Premixes sold by Animal Science Products. These particular vitamins and vitamin sources are provided as examples only, and no limitation of the scope of the present invention is intended.

"Minerals" when used herein describes and includes those inorganic compounds, whether natural or synthesized, that are required by animals to carry out and/or regulate their metabolic processes. Various examples of important mineral sources for animals include manganese, iodine, zinc, copper, cobalt, and iron compounds, and mineral salts such as dicalcium and tricalcium phosphate and monoammonium phosphate. Those of skill in the art of animal nutrition will recognize that, although the precise desired mineral source for a particular application is not listed above, the present invention nonetheless contemplates the inclusion of such desired mineral source.

"Yeast" as used herein refers to any animal-edible unicellular organism belonging to the family Saccharomycetaceae. One particularly popular source of yeast for animal feeds is dried brewer's yeast. Again, the present invention contemplates and intends that all organisms, however prepared, meeting the foregoing definition come within the scope of this invention.

The present description uses the term "animal or vegetable protein sources" to mean and include animal-edible nitrogen sources. Examples of suitable protein ingredients include dried blood and meat meal from rendering plants, cottonseed meal, soybean meal, rapeseed meal, canola meal, sunflower meal, dehydrated alfalfa, dried and sterilized animal and poultry manure, fish meal, fish solubles, cell cream, corn gluten meal, feather meal, dried brewer's grains, and distiller's dried grains. As with all the foregoing definitions, the present recitation of examples is for the skilled artisan's reference only, and no limitation on the scope of the present invention is intended by the inclusion of these specific examples.

Preferably, the balance of the present milk replacer and dry feed compositions comprises whey, corn, vitamins, minerals, and electrolytes. In the most preferred embodiments of the present invention, the dry feed is tailored more specifically to the needs of the particular species of young animal to be fed and is pelletized for greater nutrient availability and palatability. The preferred embodiments of the milk replacer composition do not have to be tailored to the particular species, and therefore they may be formulated to have the same or highly similar compositions across species lines.

While the foregoing constitutes a general description of the dietary compositions of the present invention, the following are specific examples of preferred compositions according to the present invention. The specific examples are provided for purposes of illustrating the invention and no limitations on the invention are intended thereby.

One specific example is related to dairy calves. A preferred embodiment of the milk replacer composition of the present invention has the following formulation:

| Ingredient | Percentage by Weight |
|---|---|
| Dried Inedible Egg Product | 60.00 |
| Dried Whey | 30.00 |
| Ground Yellow Corn | 8.75 |
| Vitamin Premix | 0.15 |
| Vitamin E | 0.05 |
| Trace Minerals | 0.05 |
| Calcium carbonate | 1.00 |
| Total | 100.00 |

A preferred embodiment of the dry feed composition of the present invention for use with dairy calves has the following formulation:

| Ingredient | Percentage |
|---|---|
| Dried Inedible Egg Product | 36.00 |
| Dried Whey | 12.50 |
| Ground Yellow Corn | 50.25 |
| Vitamin Premix | 0.15 |
| Vitamin E | 0.05 |
| Trace Minerals | 0.05 |
| Calcium carbonate | 1.00 |
| Total | 100.00 |

As discussed above, the raising of calves on a traditional milk replacer is difficult for the herdsman as currently available formulated products are not nutritionally equivalent to the mother's milk, a great deal of labor is necessary to hand feed the animals, and the young animals frequently fail to thrive on these nutritionally deficient products. In contrast to these problems experienced with prior art milk replacers, milk replacer compositions according to the present invention yield an increased survival rate, an increased rate of growth, and increased overall well being of young animals over that of animals fed a conventional milk replacer diet. In addition, young animals fed the present milk replacer composition transfer more quickly to solid feed, thereby reducing the overall labor required by the caretaker, including food preparation time and hand feeding.

The following table and the graph in the Figure demonstrate the ability of the milk replacer compositions of the present invention to significantly increase the growth rates of animals fed these compositions over the growth rates experienced by animals fed a conventional milk replacer. As used in the following table and the graph in the Figure, the term "Egg" refers to and is intended to comprise the milk replacer composition embodiments of the present invention, and the "Pelleted Dry Feed Composition" term refers to and comprises the dry feed composition embodiments of the instant invention.

TABLE 1

Growth and Performance of Calves Fed Formula in 2 Quarts Water Plus a Pelleted Dry Feed Composition (Free Choice) for 18 Days

| Formula | Calf number | Weight at start | Weight at finish | Average Daily Gain (per calf) | ADG (by group) |
|---|---|---|---|---|---|
| 8 ounces (oz) Egg + 1.5 oz Lecithin | 2 | 85 | 98 | 0.72 | |
| | 3 | 95 | 114 | 1.06 | 0.89 |
| 4 oz Egg + 4 oz conventional milk replacer (CMR) | 10 | 87 | 103 | 0.89 | |
| | 11 | 95 | 103 | 0.44 | 0.67 |
| 7 oz Egg + 1.5 oz CMR + 1.5 oz Lecithin | 4 | 87 | 98 | 0.61 | |
| | 5 | 98 | 108 | 0.56 | 0.58 |
| 4 oz Egg + 4 oz CMR + 1 T Lecithin | 7 | 75 | 85 | 0.56 | |
| | 8 | 80 | 90 | 0.56 | |
| | 9 | 72 | 76 | 0.22 | 0.44 |
| 8 oz CMR | 1 | 82 | 83 | 0.06 | |
| | 6 | 105 | 88 | −0.94 | |
| | 12 | 105 | 106 | 0.06 | |
| | 13 | 87 | 99 | 0.67 | |
| | 14 | 71 | 89 | 1.00 | |
| | 15 | 75 | 91 | 0.89 | 0.29 |

These improvements in animal health and growth rates are directly attributable to the nutritional profile of high quality inedible egg products according to the present invention. Fresh eggs are known to be a rich source of high quality protein. The egg white or albumen has a very high biological value in the amount and balance of amino acids. Egg albumen is frequently used as a reference to compare proteins from other sources when feeding animals such as the rat, mouse, chick, and others. The amino acid composition of whole hen's egg is used as the recommended profile for the Food and Agriculture Organization's (1965) chemical score for required amino acids in protein (Galyean and Cotteril, 1995). High quality inedible egg products also contain various naturally occurring compounds with anti-microbial activity including, but not limited to, lysozyme that acts to hydrolyze β(1–4) glycosidic bonds in bacterial cell walls; ovotransferrin that acts to chelate $Fe3+$, $Cu3+$, $Mn2+$, $Co2+$, $Cd2+$, $Zn2+$, and $Ni2+$ to thereby render the minerals unavailable to bacteria until released by digestion of protein; avidin known to bind biotin thereby rendering it unavailable to bacteria until released by digestion of protein; ovoflavoprotein known to bind riboflavin thereby rendering it unavailable to bacteria until released by digestion of protein; and ovomucoid known to inhibit the action of various enzymes.

There is a considerable reduction in the number of cases of diarrhea when young animals are fed the instant mild replacer invention. This reduction is due in large part to the beneficial antimicrobial compounds found in the high quality inedible egg fraction. A positive lowering of the pH in the stomach at an early age has also been observed. A low pH in the stomach is important to stop unsuitable bacteria from passing through the stomach whereupon it may cause diarrhea.

The following table demonstrates the ability of the milk replacer embodiment of the present invention to not only prevent diseases such as scours in calves, but to actually cure the calf of scours once an animal has contracted this disease.

TABLE 2

Health of Calves Fed Egg Diet and/or Conventional Milk Replacer

| Group | A | B | C | D |
|---|---|---|---|---|
| # in Group | 10 | 9 | 6 | 8 |
| Colostrum | 2x daily for 3 days | 2x daily for 3 days | 2x daily for 3 days | 2x daily for 3 days |
| Conventional Milk Replacer | | | 2x daily for 4 days | |
| Scours @ 7 days | No Scours | No Scours | 6 | No Scours |
| Liquid Egg Diet | 2x daily for 11 days | 2x daily for 11 days | 2x daily for 7 days | 2x daily for 11 days |
| Scours @ 14 days | No Scours | No Scours | No Scours | No Scours |

Conventional milk replacers cannot prevent, much less cure, an animal of diarrhea once an animal has contracted the disease. The general health of calves fed the milk replacer composition of the present invention is excellent as shown by the total lack of scours in the foregoing results. Additionally, the fact that calves that did develop scours were promptly cured when changed to the milk replacer of the present invention demonstrates the significant advantages to the herdsman of feeding the instant invention.

Similarly, it has been observed that calves fed the pelletized feed of the present invention are healthier and put on weight faster than their conventionally fed counterparts. This is especially true when the diet program embodiment of the present invention is employed.

The diet program embodiment of the present invention provides young animals with sources of nutrition that yield significant growth and health improvements over conventional milk replacer and dry feed diets, as is demonstrated by the following data. In the experiment from which this data was collected, one group of young calves was fed a diet program according to the present invention and a control group of calves was fed a conventional milk replacer formula known as liquid milk replacer sold by Wayne Feeds according to the following schedule.

TABLE 3

Application of Inventive Diet Program

| Age | Formula | Frequency |
|---|---|---|
| 0 to 2 days | Mother's colostrum ad libitum | 2 to 3 times per day |
| 3 to 14 days | 8 ounces dry egg in 2 quarts water | 2 times per day |
| At 5 to 7 days | Pelleted egg feed plus grains | Free choice |
| At about 7 to 8 days | | Reduce to morning feeding |
| At about 12 to 14 days | | Wean from liquid feed |
| At about 3 weeks | Increase grain feed | Free choice |
| At about 6 weeks | Change to conventional diet | Free choice |

The following table illustrates the significant difference in growth rates between calves fed the instant diet program versus those fed a conventional milk replacer.

TABLE 4

Weight (pounds) of Young Calves Fed Inventive Diet Program Compared with Weight of Young Calves Fed Conventional Milk Replacer

| Group | A | B | Difference |
|---|---|---|---|
| Treatment | Fed Egg Diet | Control Diet | |
| 2 days of age | 80 | 80 | — |
| 63 days of age | 280 | 175 | 105 |

This substantially increased rate of weight gain could not be expected based on the teachings of the prior art. The rapid weight gain caused by feeding the present inventive compositions increases yields and decreases operating costs to the herdsman compared with traditional diet and husbandry methods.

Another specific application of the diet program of the present invention is directed to young pigs. A preferred embodiment of the milk replacer composition of the present invention has the following formulation:

| Ingredient | Percentage by Weight |
|---|---|
| Dried Inedible Egg Product | 98.75 |
| Vitamin Premix | 0.15 |
| Vitamin E | 0.05 |
| Trace Minerals | 0.05 |
| Calcium carbonate | 1.00 |
| Total | 100.00 |

A preferred embodiment of a dry feed composition of the present invention for use with weanling piglets has the following formulation:

| Ingredient | Percentage |
| --- | --- |
| Dried Inedible Egg Product | 36.00 |
| Ground Yellow Corn | 62.75 |
| Vitamin Premix | 0.15 |
| Vitamin E | 0.05 |
| Trace Minerals | 0.05 |
| Calcium carbonate | 1.00 |
| Total | 100.00 |

A second preferred embodiment of a dry feed composition of the present invention for use with weaned piglets includes the following formulation:

| Ingredient | Percentage |
| --- | --- |
| Dried Inedible Egg Product | 5.00 |
| Ground Yellow Corn | 93.75 |
| Vitamin Premix | 0.15 |
| Vitamin E | 0.05 |
| Trace Minerals | 0.05 |
| Calcium carbonate | 1.00 |
| Total | 100.00 |

As discussed above with respect to calves, the raising of young pigs on a traditional milk replacer is difficult for the producer as currently available formulated products are not nutritionally equivalent to the mother's milk, a great deal of labor is necessary to hand feed the animals, and the young animals frequently fail to thrive on these nutritionally deficient products. In contrast to these problems experienced with prior art milk replacers, egg-based feed compositions according to the present invention yield an increased survival rate, an increased rate of growth, and increased overall well being of young animals over that of animals fed a conventional milk replacer diet. In addition, young animals fed the milk replacer composition according to the present invention transfer more quickly to solid feed, thereby reducing the overall labor required by the caretaker, including food preparation time and hand feeding.

One approach in addressing the deficiencies of prior art milk replacers for segregated early weaning of piglets has been to provide milk replacer compositions that include porcine plasma protein. Plasma enhanced milk replacer and feed compositions are employed during post-weaning of piglets that are weaned at 14 to 16 days and raised in a segregated early weaning environment. Early weaned piglets only have the gamma globulin obtained from colostrum milk and are not capable of producing gamma globulin for 1 to 2 weeks post-weaning. Porcine plasma is rich in immunoglobulins and amino acids, and the pattern of amino acids closely aligns to the needs of the segregated early weaned piglets.

As used in the following Tables 5–11, the term "Spray Dried Egg" refers to and is intended to comprise the high quality inedible egg embodiments of the present invention. As for methodology for the diet programs listed in Table 5, one hundred sixty-eight pigs weaned at 14 to 16 days having initial weights averaging 9.9 pounds were placed in nursery units. Each pen was designated as an experimental unit. Pigs were allotted by weight and gender, 6 pigs per pen and 7 replications per treatment, and placed on plastic slotted floors in an environmentally controlled room. The initial room temperature was 34° C., which temperature was reduced by 1.5° C. per week thereafter. Each pen was 4.9 feet×4.9 feet, and pigs had ad libitum access to feed and water. Pigs were weighed at 10, 24, and 38 days postweaning to evaluate gain, feed intake, and feed efficiency.

Nursery units of pigs were randomly allotted to four experimental diets containing the major ingredients corn, soybean meal, dried whey, and yellow swine grease allotted as indicated in Table 5. In the four experimental diets, the spray dried eggs were substituted for 0%, 33⅓%, 66⅔% and 100%, respectively, of the plasma protein. The substitution of spray dried egg for plasma protein was made on an equal protein basis, which substitution recognized that plasma protein has 78% protein content while spray dried eggs have 44% protein content. The Phase 1 diets were fed for 10 days.

TABLE 5

Phase 1 Diet Composition.

| Diet Number | 1-1 | 2-1 | 3-1 | 4-1 |
| --- | --- | --- | --- | --- |
| Spray Dried Eggs | 0 | 4.13 | 8.27 | 12.41 |
| Plasma Protein | 7.0 | 4.67 | 2.33 | 0 |
| Corn | 36.6 | 34.49 | 32.69 | 30.78 |
| Reg. Soybean Meal | 29.5 | 29.8 | 28.8 | 29.9 |
| Whey | 15.0 | 15.0 | 15.0 | 15.0 |
| Yellow Grease | 7.0 | 7.0 | 7.0 | 7.0 |
| DiCal Phos. | 1.51 | 1.51 | 1.51 | 1.51 |
| Limestone | 1.25 | 1.25 | 1.25 | 1.25 |
| Salt | .25 | .25 | .25 | .25 |
| ZnO | .38 | .38 | .38 | .38 |
| DL Methionine | .10 | .10 | .10 | .10 |
| Antibiotic[a] | 1.00 | 1.00 | 1.00 | 1.00 |
| Swine Vit. Mix[b] | .25 | .25 | .25 | .25 |
| Swine TM Mix[c] | .12 | .12 | .12 | .12 |
| Se 600 Mix[d] | .05 | .05 | .05 | .05 |
| Lysine | 1.55 | 1.55 | 1.55 | 1.55 |
| Meth/Cys | .85 | .85 | .85 | .85 |
| Ca | 1.00 | 1.00 | 1.00 | 1.00 |
| P | 80 | 80 | 80 | 80 |

[a]Mecadox, 50 g/ton.
[b]Supplied the following per pound of diet: 2750 IU Vitamin A, 275 IU Vitamin $D_3$, 20 IU Vitamin E, .016 mg Vitamin $B_{12}$, 2.77 mg Vitamin K, .91 mg Mendaione, 3.2 mg Riboflavin, 10 mg d-Pantothenic Acid, 15 mg Niacin.
[c]Supplied the following per pound of diet: 11 ppm Cu, .40 ppm I, 116 ppm Fe, 14 ppm Manganese, 116 ppm Zn.
[d]Supplied .3 ppm Se per pound of diet.

In Phase 2 diets, the levels of plasma protein and spray dried egg were reduced by 50% as shown in Table 6. The Phase 2 diet programs were fed for a 14-day period. For the Phase 3 diet programs, also shown in Table 6, all pigs received the same diet for a 14-day period. The Phase 3 diets contained neither plasma protein nor spray dried egg in order to measure sustaining effects of the ingredients included for reasons other than contribution of nutrients. Tables 7 and 8 provide a summary of the diet variables for each of the four diet programs of Phase 1 and Phase 2.

TABLE 6

Phase 2 and Phase 3 Diet Composition.

| | Phase 2 | | | | Phase 3 |
| --- | --- | --- | --- | --- | --- |
| Diet Number | 2-1 | 2-2 | 2-3 | 2-4 | 3-0 |
| Spray Dried Eggs | 0 | 2.06 | 4.13 | 6.20 | 0 |
| Plasma Protein | 3.50 | 2.34 | 1.16 | 0 | 0 |
| Corn | 31.32 | 30.32 | 29.38 | 28.42 | 29.04 |
| Reg. Soybean Meal | 37.75 | 37.85 | 37.90 | 37.95 | 43.9 |
| Whey | 15.0 | 15.0 | 15.0 | 15.0 | 15.0 |

TABLE 6-continued

Phase 2 and Phase 3 Diet Composition.

| | Phase 2 | | | | Phase 3 |
|---|---|---|---|---|---|
| Diet Number | 2-1 | 2-2 | 2-3 | 2-4 | 3-0 |
| Yellow Grease | 7.0 | 7.0 | 7.0 | 7.0 | 7.0 |
| DiCal Phos. | 1.18 | 1.18 | 1.18 | 1.18 | 2.11 |
| Limestone | 2.10 | 2.10 | 2.10 | 2.10 | .80 |
| Salt | .25 | .25 | .25 | .25 | .25 |
| ZnO | .38 | .38 | .38 | .38 | .38 |
| DL Methionine | .10 | .10 | .10 | .10 | .10 |
| Antibiotic | 1.00 | 1.00 | 1.00 | 1.00 | 1.00 |
| Swine Vit. Mix | .25 | .25 | .25 | .25 | .25 |
| Swine TM Mix | .12 | .12 | .12 | .12 | .12 |
| Se 600 Mix | .05 | .05 | .05 | .05 | .05 |
| Lysine | 1.50 | 1.50 | 1.50 | 1.50 | 1.45 |
| Meth/Cys | .82 | .82 | .82 | .82 | .80 |
| Ca | 1.00 | 1.00 | 1.00 | 1.00 | 0.90 |
| P | 80 | 80 | 80 | 80 | 0.75 |

TABLE 7

Diet variables in Phase 1.

| | Porcine Plasma Protein | Spray Dried Egg |
|---|---|---|
| Diet 1 | 7.0 | 0 |
| Diet 2 | 4.67 | 4.13 |
| Diet 3 | 2.33 | 8.27 |
| Diet 4 | 0 | 12.41 |

TABLE 8

Diet variables in Phase 2.

| | Porcine Plasma Protein | Spray Dried Egg |
|---|---|---|
| Diet 1 | 3.50 | 0 |
| Diet 2 | 2.34 | 2.06 |
| Diet 3 | 1.17 | 4.13 |
| Diet 4 | 0 | 6.20 |

Table 9 provides a summary of the results of the growth performance data. The growth performance data indicates that growth performance was excellent across all treatments with no statistically significant difference ($P<0.05$) in the final weight after 38 days of the test. Treatment means for pig weights ranged from 43.5 to 45.6 pounds at the finish of the experiment. There were no death losses on any treatment during the entire study. The four combinations of plasma protein and spray dried eggs supported similar gains.

During Phase 1, the first 10 days of the study, there was a small but significant ($P<0.05$) difference in daily gain, with the two higher levels of plasma protein supporting greater gain. During the second phase, a 14-day period, only the highest level of plasma protein supported greater gain, about 0.1 lb/day. During Phase 3, a 14-day period, and for the overall 38-day period, there were no significant ($P<0.05$) differences in daily gain due to treatment.

Daily feed intake appeared to be lower during Phase 1 for the diet program in which all plasma protein was replaced with spray dried eggs, but the differences were not significant ($P<0.05$.) In Phase 2, feed intake appeared to decline as plasma protein was reduced, but only the diet with the lowest level of plasma protein was significantly different ($P<0.01$.) Daily feed intake for Phase 3 and for the overall 38 day period were almost constant across the four diet programs.

Feed efficiency values were similar across all treatments during each phase and for the overall experiment. Feed efficiency treatment means ranged from 1.46 to 1.53 for the entire 38-day study. The egg-based feed composition of the present invention maintained efficiency equal to that attained with plasma protein enhanced feed compositions.

TABLE 9

Results of feeding trial[c].

| Diet Program | 1 | 2 | 3 | 4 | Significance |
|---|---|---|---|---|---|
| Ratio of Spray Dried Plasma Protein/Spray Dried Egg Protein | 3/0 | 2/1 | 1/2 | 0/4 | |
| Initial Weight, lb | 11.6 | 11.5 | 11.5 | 11.6 | NS |
| Final Weight, lb | 45.57 | 45.25 | 43.55 | 43.50 | NS |
| Daily Gain, lb | | | | | |
| Phase 1 | .30[a] | .30[a] | .26[b] | .22[b] | .05 |
| Phase 2 | .88[a] | .80[b] | .78[b] | .79[b] | .05 |
| Phase 3 | 1.33 | 1.39 | 1.32 | 1.33 | NS |
| Overall | .89 | .89 | .84 | .84 | NS |
| Daily Feed, lb | | | | | |
| Phase 1 | .52 | .50 | .49 | .39 | NS |
| Phase 2 | 1.42[a] | 1.32[a,b] | 1.27[a,b] | 1.24[b] | .01 |
| Phase 3 | 1.86 | 1.92 | 1.88 | 1.81 | NS |
| Overall | 1.34 | 1.32 | 1.29 | 1.23 | NS |

TABLE 9-continued

Results of feeding trial[c].

| Diet Program | 1 | 2 | 3 | 4 | Significance |
|---|---|---|---|---|---|
| Feed/Gain Ratio | | | | | |
| Phase 1 | 1.71 | 1.65 | 1.89 | 1.78 | NS |
| Phase 2 | 1.61 | 1.65 | 1.64 | 1.57 | NS |
| Phase 3 | 1.40 | 1.37 | 1.42 | 1.36 | NS |
| Overall | 1.50 | 1.49 | 1.53 | 1.46 | NS |

[a,b]Means with different superscripts are significantly different.
[c]Phase 1, 10 days; Phase 2, 14 days; Phase 3, 14 days.

This study indicates that the egg-based feed composition of the present invention provides an excellent alternative for plasma protein when substituted on an equal protein basis. Combinations of the two immunoglobulin sources providing the same total protein was no better than either source fed separately. In addition, the egg-based feed composition of the present invention provides some additional energy compared to plasma-enhanced feed, as the egg-based product contains about 25% fat.

These and the following results indicate that the egg-based feed compositions of the present invention can achieve at least the same growth performance and feed efficiency as plasma-enhanced feed compositions in segregated early weaned piglets. Advantageously the growth performance and feed efficiency enjoyed by the present invention can be obtained at a cost significantly less than that of plasma-enhanced feed compositions. The results demonstrate the ability of the egg-based feed compositions of the present invention to provide an excellent alternative for plasma protein when substituted on an equal protein basis.

Additional studies have compared the growth and efficiency rates created by use of egg-based feed compositions of the present invention with the rates created by us of plasma-enhanced feed compositions for weaned pigs. As shown in Table 10, the ten day study indicates that the daily gain and feed efficiency rates achieved when the test subjects were fed the egg-based feed composition of the present invention was greater than the rates obtained from feeding a plasma-enhanced feed composition to weaned pigs.

TABLE 10

Spray Dried Eggs and Spray Dried Plasma in Diets for Weaned Pigs*

| | Spray Dried Eggs** | Spray Dried Plasma** |
|---|---|---|
| Swine Unit 1 (10 Day Study) | | |
| Daily gain, g | 215 | 211 |
| Daily feed, g | 267 | 269 |
| Feed/Gain | 1.24 | 1.28 |
| Swine Unit 2 (7 Day Study) | | |
| Daily gain, g | 243 | 250 |
| Daily feed, g | 260 | 258 |
| Feed/Gain | 1.07 | 1.03 |

*Pigs weaned at 28 days and started on test
*Twenty pigs per treatment at each site
**8% spray dried eggs or 5% spray dried plasma The results of another feed efficiency study are presented in Table 11. Thirty-six piglets were present in each control group for this study. The diet variables between each group were the presence of plasma or egg in the feed composition and the amount of egg in the feed composition. The control diet lacked any plasma or egg, which ingredients were replaced with corn, soybean meal, and other typical feed ingredients fortified with vitamins and minerals for a pig. In this study, the feed efficiency for pigs fed a diet containing the egg-based feed composition of the present invention was about the same as or greater than the feed efficiency experienced by weaned pigs fed a diet containing a plasma-enhanced feed composition for three of the egg-based control groups.

TABLE 11

Spray Dried Eggs and Spray Dried Plasma in Diets for Weaned Pigs

| Group | Diet Variable | Feed Efficiency |
|---|---|---|
| | Phase 1 (10 Days) | |
| 1 | 6% Plasma | 1.54 |
| 2 | Control | 1.63 |
| 3 | 4% Egg | 1.76 |
| 4 | 8% Egg | 1.95 |
| 5 | 12% Egg | 1.97 |
| | Phase 2 (14 Days) | |
| 1 | 3% Plasma | 1.61 |
| 2 | Control | 1.55 |
| 3 | 2% Egg | 1.65 |
| 4 | 4% Egg | 1.74 |
| 5 | 6% Egg | 1.90 |
| | Phase 3 (14 Days) | |
| 1 | Control | 2.00 |
| 2 | Control | 2.04 |
| 3 | Control | 1.98 |
| 4 | Control | 1.77 |
| 5 | Control | 1.94 |
| | Summary (38 Days) | |
| 1 | | 1.79 |
| 2 | | 1.805 |
| 3 | | 1.835 |
| 4 | | 1.775 |
| 5 | | 1.929 |

36 pigs in each group

The ability of the egg-based feed compositions of the present invention to achieve growth rates and feed efficiencies similar to or better than the rates and efficiencies obtained through use of plasma enhanced feed compositions is directly attributable to the nutritional profile of high quality inedible egg products according to the present invention, which pofile is discussed further above. This ability to lower costs and achieve the same or substantially the same results by replacing plasma-enhanced feed compositions with the egg-based feed compositions of the present invention could not be expected based on the teachings of the prior art.

An additional benefit of the dry feed formula of the present invention concerns the efficiency with which the instant formulas may be pelletized. The inedible egg fraction contained in the dry formula being pelleted serves as an excellent lubricant for the pelletizing apparatus. This makes the pelletizing equipment much more efficient than it is when pelletizing conventional dry food formulations because it allows the pelletizing equipment to operate with a much lower power demand. This lower power demand decreases manufacturing costs for pelletized feed, and results again in a benefit to the herdsman of decreased feed costs for his or her animals. This also is an unexpected benefit of using high quality inedible egg products in a diet program for young animals.

Furthermore, the sugar content in the whey fraction of the preferred pelleted feed embodiments imparts desirable flavor and texture characteristics to the pellets that are formed. Pellets manufactured according to the present invention are firmer and hold together better than traditional dry pellet formulations including whey.

Those of skill in the art will recognize that all feeding programs incorporating diet compositions according to the present invention must be devised to meet the developmental needs of the particular species being fed. Therefore, it is irrelevant what ingredients comprise the balance of feeds containing less than 100% high quality inedible egg, so long as those ingredients meet the nutritional requirements of the young animal for which the feed is intended. It is also irrelevant to the present invention when the skilled artisan decides to offer solid food to the young animal to begin the weaning process, and it is irrelevant from which types of inedible egg the high quality inedible egg product is derived. What is relevant is that the various embodiments of the present invention are formulated to yield healthy young animals that grow quickly.

When young animals are fed the instant diet embodiments, whether or not the instant diet program is used, the antimicrobial compounds and nutritive components present in the liquid or dry inedible egg fraction minimize or eliminate the need to feed drugs to the animals, and thereby minimize or eliminate the significant costs presently associated with treating diseases in these animals. These compounds and nutritive components are also capable of curing certain microbe-caused diseases. Further, both the liquid and dry foodstuffs have an excellent amino acid profile, constitute rich sources of high quality protein, and are easy to digest. It is easy to pelletize compositions including a high quality inedible egg fraction because the egg lubricates the machinery and reduces power consumption of the pelletizing apparatus. Newborn animals fed compositions according to the present invention put on weight faster, have an increased survival rate, and will convert more quickly to solid food than animals fed a prior art feed composition.

While the invention has been described in detail in the foregoing description, the same is to be considered as illustrative and not restrictive in character, it being understood that only the preferred embodiments have been shown and described, and that all changes and modifications that come within the spirit of the invention are desired to be protected.

What is claimed is:

1. An egg-based food composition for increasing the growth rate and thereby reducing the animal husbandry costs associated with raising young pigs, consisting essentially of, by weight:
   high quality inedible egg from about 1% to 100%; and
   at least one ingredient selected from the group consisting of:
      milk product, cereal grain or cereal grain product, fruit pectin, carbohydrate, fiber, fat, urea, electrolyte, vitamin, mineral, yeast, and animal or vegetable protein source as the balance.

2. The egg-based food composition of claim 1, wherein said egg-based food composition consists essentially of, by weight:
   high quality inedible egg from about 1% to about 15%;
   corn from about 85% to about 99%;
   vitamin mix from about 0.05% to about 0.25%
   vitamin E from about 0.01% to about 0.1%;
   mineral mix from about 0.01% to about 0.1%; and
   calcium carbonate from about 0.1% to about 2%.

3. The egg-based food composition of claim 1, wherein said egg-based food composition consists essentially of, by weight:
   high quality inedible egg from about 25% to about 45%;
   corn from about 55% to about 75%;
   vitamin mix from about 0.05% to about 0.25%
   vitamin E from about 0.01% to about 0.1%;
   mineral mix from about 0.01% to about 0.1%; and
   calcium carbonate from about 0.1% to about 2%.

4. The egg-based food composition of claim 1, wherein said egg-based food composition consists essentially of, by weight:
   high quality inedible egg from about 97% to about 99.5%;
   vitamin mix from about 0.05% to about 0.25%
   vitamin E from about 0.01% to about 0.1%;
   mineral mix from about 0.01% to about 0.1%; and
   calcium carbonate from about 0.1% to about 2%.

5. A method of increasing the growth rate and thereby reducing animal husbandry costs associated with raising young pigs, comprising the steps of:
   preparing an egg-based milk replacer for a young pig, consisting essentially of, by weight:
      high quality inedible egg from about 1% to 100%; and
      at least one ingredient selected from the group consisting of:
         milk product, cereal grain or cereal grain product, fruit pectin, carbohydrate, fiber, fat, urea, electrolyte, vitamin, mineral, yeast, and animal or vegetable protein source as the balance; and
   feeding said egg-based milk replacer to said young pig until said young pig reaches an age at which it may be weaned from said egg-based milk replacer; wherein said egg-based milk replacer encourages growth in said young pig to thereby achieve a growth rate at least equivalent to a growth rate experienced by a young pig fed at least one of mother's milk and plasma-enhanced milk replacer.

6. The method according to claim 5, and further comprising the steps of:
   preparing an egg-based dry feed for a young pig, consisting essentially of, by weight:
      high quality inedible egg from about 1% to 100%; and
      at least one ingredient selected from the group consisting of:
         milk product, cereal grain or cereal grain product, fruit pectin, carbohydrate, fiber, fat, urea, electrolyte, vitamin, mineral, yeast, and animal or vegetable protein source as the balance; and
   feeding said egg-based dry feed to said young pig until said young pig reaches an age at which it may begin eating adult food, wherein said egg-based dry feed encourages growth in said young pig to thereby achieve a growth rate at least equivalent to a growth rate experienced by a young pig fed at least one of conventional dry feed and plasma-enhanced dry feed composition.

7. The method according to claim 6, wherein the egg-based dry feed consists essentially of, by weight:
   high quality inedible egg from about 1% to about 15%;
   corn from about 85% to about 99%;
   vitamin mix from about 0.05% to about 0.25%
   vitamin E from about 0.01% to about 0.1%;
   mineral mix from about 0.01% to about 0.1%; and
   calcium carbonate from about 0.1% to about 2%.

8. The method according to claim 5, and further wherein said egg-based milk replacer imparts disease resistance to said young pig to thereby achieve disease resistance at least equivalent to that found in a young pig fed at least one of mother's milk and plasma-enhanced milk replacer.

9. The method according to claim 5, wherein the egg-based milk replacer consists essentially of, by weight:
   high quality inedible egg from about 97% to about 99.5%;
   vitamin mix from about 0.05% to about 0.25%
   vitamin E from about 0.01% to about 0.1%;
   mineral mix from about 0.01% to about 0.1%; and
   calcium carbonate from about 0.1% to about 2%.

10. A method of increasing the growth rate and thereby reducing animal husbandry costs associated with raising young pigs, comprising the steps of:
   preparing an egg-based dry feed for a young pig, consisting essentially of, by weight:
      high quality inedible egg from about 1% to 100%; and
      at least one ingredient selected from the group consisting of:
         milk product, cereal grain or cereal grain product, fruit pectin, carbohydrate, fiber, fat, urea, electrolyte, vitamin, mineral, yeast, and animal or vegetable protein source as the balance; and
   feeding said egg-based dry feed to said young pig until said young pig reaches an age at which it may begin eating adult food, wherein said egg-based dry feed encourages growth in said young pig to thereby achieve a growth rate at least equivalent to a growth rate experienced by a young pig fed at least one of conventional dry feed and plasma-enhanced dry feed composition.

11. The method according to claim 10, and further wherein said egg-based dry feed imparts disease resistance to said young pig to thereby achieve disease resistance at least equivalent to that found in a young pig fed at least one of conventional dry feed and plasma-enhanced dry feed composition.

12. The method according to claim 10, wherein the egg-based dry feed consists essentially of, by weight:
   high quality inedible egg from about 1% to about 15%;
   corn from about 85% to about 99%;
   vitamin mix from about 0.05% to about 0.25%
   vitamin E from about 0.01% to about 0.1%;
   mineral mix from about 0.01% to about 0.1%; and
   calcium carbonate from about 0.1% to about 2%.

13. An egg-based food composition for increasing the growth rate and thereby reducing the animal husbandry costs associated with raising young pigs, comprising:
   high quality inedible egg from about 1% to less than 100%; and
   at least one ingredient selected from the group consisting of:
      milk product, cereal grain or cereal grain product, fruit pectin, carbohydrate, fiber, fat, urea, electrolyte, vitamin, mineral, yeast, and animal or vegetable protein source as the balance.

14. The egg-based feed composition of claim 13, wherein said composition comprises:
   high quality inedible egg from about 1% to about 15%;
   corn from about 85% to about 99%;
   vitamin mix from about 0.05% to about 0.25%
   vitamin E from about 0.0% to about 0.1%;
   mineral mix from about 0.01% to about 0.1%; and
   calcium carbonate from about 0.1% to about 2%.

15. The egg-based feed composition of claim 13, wherein said composition comprises:
   high quality inedible egg from about 25% to about 45%;
   corn from about 55% to about 75%;
   vitamin mix from about 0.05% to about 0.25%
   vitamin E from about 0.01% to about 0.1%;
   mineral mix from about 0.01% to about 0.1%; and
   calcium carbonate from about 0.1% to about 2%.

16. The egg-based feed composition of claim 13, wherein said composition comprises:
   high quality inedible egg from about 97% to about 99.5%;
   vitamin mix from about 0.05% to about 0.25%
   vitamin E from about 0.01% to about 0.1%;
   mineral mix from about 0.01% to about 0.1%; and
   calcium carbonate from about 0.1% to about 2%.

17. The egg-based feed composition of claim 13, wherein said composition comprises:
   high quality inedible egg from about 1% to about 15%;
   corn from about 25% to about 35%;
   soybean meal from about 25% to about 40%;
   whey from about 10% to about 20%; and
   yellow grease from about 5% to about 10%.

18. A method of increasing the growth rate and thereby reducing the animal husbandry costs of raising young pigs, comprising the steps of:
   preparing an egg-based milk replacer for a young pig comprising high quality inedible eggs;
   feeding said egg-based milk replacer to said young pig until said young pig reaches an age at which it may be weaned from said egg-based milk replacer; wherein said egg-based milk replacer encourages growth in said young pig to thereby achieve a growth rate at least equivalent to a growth rate experienced by a young pig fed at least one of mother's milk and plasma-enhanced milk replacer;
   preparing an egg-based dry feed for a weaned young pig, comprising high quality inedible eggs; and
   feeding said egg-based dry feed to said weaned young pig until said weaned young pig reaches an age at which it may begin eating adult feed, wherein said egg-based dry feed encourages growth in said weaned young pig to thereby achieve a growth rate at least equivalent to a growth rate experienced by a young pig fed one of conventional dry feed and plasma-enhanced dry feed composition.

19. The method according to claim 18, and further wherein said egg-based milk replacer and said egg-based dry feed impart disease resistance to said young pig and said weaned young pig to thereby achieve disease resistance at least equivalent to that found in a young pig fed at least one of mother's milk and plasma enhanced food composition.

20. The method of claim 19, wherein said egg-based milk replacer further comprises at least one ingredient selected from the group consisting of milk product, cereal grain or cereal grain product, fruit pectin, carbohydrate, fiber, fat, urea, electrolyte, vitamin, mineral, yeast, and animal or vegetable protein source.

21. The method according to claim 20, wherein said egg-based milk replacer comprises:

high quality inedible egg from about 97% to about 99.5%;
vitamin mix from about 0.05% to about 0.25%
vitamin E from about 0.01% to about 0.1%;
mineral mix from about 0.01% to about 0.1%; and
calcium carbonate from about 0.1% to about 2%.

22. The method of claim 21, wherein said egg-based dry feed further comprises at least one ingredient selected from the group consisting of milk product, cereal grain or cereal grain product, fruit pectin, carbohydrate, fiber, fat, urea, electrolyte, vitamin, mineral, yeast, and animal or vegetable protein source.

23. The method according to claim 22, wherein the egg-based dry feed comprises:

high quality inedible egg from about 25% to about 45%;
corn from about 55% to about 75%;
vitamin mix from about 0.05% to about 0.25%
vitamin E from about 0.01% to about 0.1%;
mineral mix from about 0.01% to about 0.1%; and
calcium carbonate from about 0.1% to about 2%.

* * * * *